United States Patent
Martin et al.

(10) Patent No.: US 9,540,517 B2
(45) Date of Patent: Jan. 10, 2017

(54) METHOD FOR PREPARING A COMPOSITION COMPRISING COLOURED SILICATE MINERAL PARTICLES AND A COMPOSITION COMPRISING COLOURED SILICATE MINERAL PARTICLES

(71) Applicants: CENTRE NATIONAL DE LA RECHERCHE SCIENTIFIQUE (C.N.R.S.), Paris (FR); UNIVERSITE PAUL SABATIER TOULOUSE III, Toulouse (FR)

(72) Inventors: Francois Martin, Sainte Foy D'aigrefeuille (FR); Emmanuel Gardes, Caen (FR); Pierre Micoud, Peyssies (FR); Christophe Le Roux, Avignonet-Lauragais (FR)

(73) Assignees: CENTRE NATIONAL DE LA RECHERCHE SCIENTIFIQUE (C.N.R.S.), Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 0 days.

(21) Appl. No.: 14/431,957

(22) PCT Filed: Sep. 20, 2013

(86) PCT No.: PCT/FR2013/052194
§ 371 (c)(1),
(2) Date: Apr. 22, 2015

(87) PCT Pub. No.: WO2014/049250
PCT Pub. Date: Apr. 3, 2014

(65) Prior Publication Data
US 2015/0240083 A1    Aug. 27, 2015

(30) Foreign Application Priority Data

Sep. 28, 2012  (FR) ...................... 12 59231

(51) Int. Cl.
*C09C 1/28* (2006.01)
*C01B 33/38* (2006.01)

(52) U.S. Cl.
CPC ................. *C09C 1/28* (2013.01); *C01B 33/38* (2013.01); *C01P 2002/52* (2013.01);
(Continued)

(58) Field of Classification Search
CPC ... C01B 33/38; C01P 2002/52; C01P 2002/54; C01P 2002/72; C01P 2002/78; C09C 1/28
See application file for complete search history.

(56) References Cited

U.S. PATENT DOCUMENTS 7,794,625 B2    9/2010  Martin et al.
8,444,946 B2 *  5/2013  Martin .................... C01B 33/20
                                                          423/324
(Continued)

FOREIGN PATENT DOCUMENTS

| WO | 00/63299 A1 | 10/2000 |
| WO | 2008/009800 A2 | 1/2008 |
| WO | 2012/085239 A1 | 6/2012 |

OTHER PUBLICATIONS

International Search Report, dated Dec. 11, 2013, from corresponding PCT application.

*Primary Examiner* — Shuangyi Abu Ali
(74) *Attorney, Agent, or Firm* — Young & Thompson

(57) ABSTRACT

A method for preparing a composition including silicate mineral particles that have coloring properties in which a talcose composition, including phyllosilicate mineral particles chosen from the group formed: from the particles having the chemical formula: $((Si_xGe_{1-x})_4 M_3O_{10}(OH)_2$, the particles having at least one interlayer space and having the chemical formula: $(Si_xGe_{1-x})_4 M_{3-\epsilon} O_{10}(OH)_2, (M'^{m+})_\epsilon \cdot nH_2O$: -M having the formula $Mg_{y(1)}Co_{y(2)}Zn_{y(3)}Cu_{y(4)}$ (Continued)

$Mn_{y(5)}Fe_{y(6)}Ni_{y(7)}Cr_{y(8)}$; -$M^{m+}$ designating at least one interlayer cation, the silicate mineral particles having a thickness of less than 100 nm and of which the largest dimension is less than 10 μπι, is brought into contact with a dye solution, including dye cations, of at least one element chosen from the transition metals, the lanthanides and the actinides. The composition obtained by this method is also described.

17 Claims, 1 Drawing Sheet

(52) U.S. Cl.
CPC ...... *C01P 2002/54* (2013.01); *C01P 2002/72* (2013.01); *C01P 2002/78* (2013.01)

(56) References Cited

U.S. PATENT DOCUMENTS

2009/0261294 A1* 10/2009 Martin ............... C01B 33/20
  252/182.33
2013/0343980 A1   12/2013 Le Roux et al.

* cited by examiner

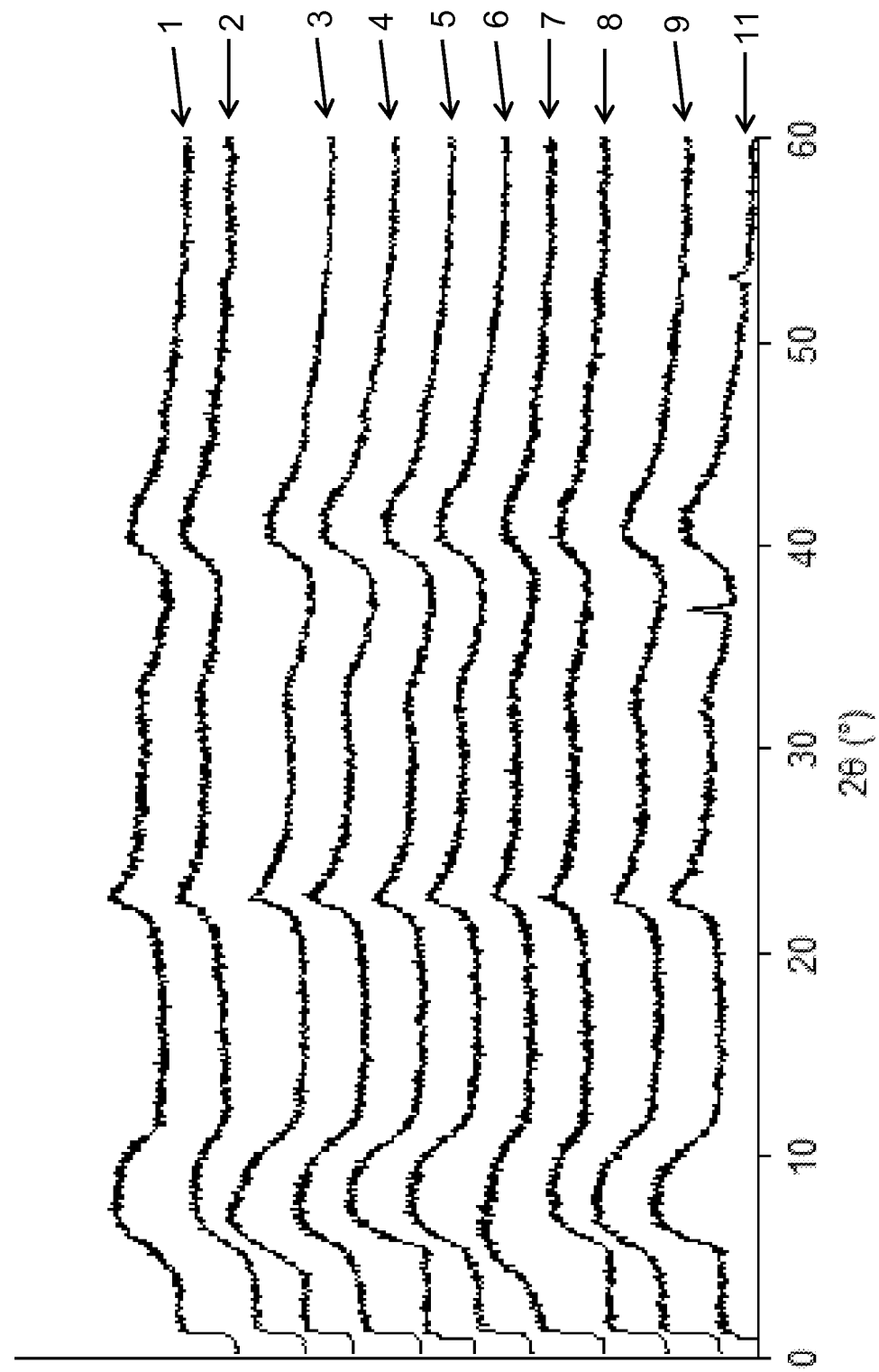

METHOD FOR PREPARING A COMPOSITION COMPRISING COLOURED SILICATE MINERAL PARTICLES AND A COMPOSITION COMPRISING COLOURED SILICATE MINERAL PARTICLES

FIELD OF THE INVENTION

The invention relates to a method for preparing a composition comprising colored silicate mineral particles, and to a composition, so obtained, comprising colored silicate mineral particles.

BACKGROUND OF THE INVENTION

Phyllosilicates are composed of an irregular stack of elementary lamellae of crystalline structure, the number of which varies from several units to several tens of units. Among the phyllosilicates (lamellar silicates), the group comprising especially talc, mica and montmorillonite is characterized by the fact that each elementary lamella is constituted by the association of two tetrahedral layers situated on either side of an octahedral layer. This group corresponds to the 2:1 phyllosilicates, which include especially the smectites. In view of their structure, the 2:1 phyllosilicates are also described as being of the T.O.T. (tetrahedron-octahedron-tetrahedron) type.

The octahedral layer of the 2:1 phyllosilicates is formed of two planes of $O^{2-}$ and $OH^-$ ions (in the molar proportion $O^{2-}/OH^-$ of 2/1). On either side of this middle layer there are two-dimensional lattices of tetrahedrons, of which one of the vertices is occupied by an oxygen of the octahedral layer, while the other three are occupied by substantially coplanar oxygens. In natural smectites, for example, the tetrahedral sites are generally occupied by $Si^{4+}$ or $Al^{3+}$ ions, and the octahedral sites are in mosts cases occupied by $Mg^{2+}$, $Fe^{2+}$, $Al^{3+}$ and/or $Fe^{3+}$ cations. A small proportion of the octahedral and/or tetrahedral sites of the smectites is not occupied and is responsible for the cation deficit of the crystalline lattice forming the elementary lamellae.

Some phyllosilicates, such as smectites, are also characterized by the presence, between the elementary lamellae, of interfoliar spaces which contain water and cations and which form a swelling phase of the mineral. The smectites are therefore described as being of the swelling T.O.T. type. In natural smectites, these interfoliar cations are generally $Mg^{2+}$, $Ca^{2+}$ and/or $Na^+$ ions.

Phyllosilicate mineral particles, such as talc, are used in the form of fine particles in many industrial sectors, for example: rubber, thermoplastics, paper, paints, pharmacy, cosmetics or also phytosanitary products. They are used as an inert filler (for their chemical stability or for the dilution of expensive active compounds) or as functional fillers (for example to enhance the mechanical properties of some materials).

WO 2008/009800 proposes a method for preparing 2:1 phyllogermanosilicate-swelling phyllogermanosilicate (T.O.T.-swelling T.O.T.) interlayer compositions which can be used especially as a precursor for the preparation of talcose compositions, in particular synthetic talc. These T.O.T.-swelling T.O.T. interlayer compositions are synthesized by precipitation of a gel containing silicon and/or germanium and metal followed by a hydrothermal treatment of the gel at a temperature of from 150° to 300° C. The parameters used for carrying out the method for preparing these compositions allow some of the structural characteristics of the synthesized mineral particles to be controlled, in particular the crystallinity and the swelling mineral phase/non-swelling mineral phase ratio.

The synthesized T.O.T.-swelling T.O.T. interlayer particles described in WO 2008/009800 can have different colors depending on the metal salt used in the starting gel containing silicon and/or germanium and metal.

However, obtaining T.O.T.-swelling T.O.T. interlayer particles according to WO 2008/009800 requires that the protocol for synthesizing these particles be carried out in its entirety for each color desired, and that the synthesis parameters be changed for each product of a different color that is desired. Furthermore, once the T.O.T.-swelling T.O.T. interlayer particles have been synthesized, their color cannot be modified, the color being determined by the choice of reagents used in the first step of precipitation of the gel containing silicon and/or germanium and metal. Moreover, the choice of colors which can thus be obtained according to WO 2008/009800 remains limited, it being limited by the starting divalent metal salts which can be used.

In addition, although some natural talcs (steatites) exhibit varied colors such as pink, grey or green when they are in the form of blocks as obtained directly after extraction, grinding thereof into fine particles irretrievably leads to the obtaining of powders which are white to greyish in color, the color of the natural talc being due solely to the particular arrangement of the talc particles relative to one another. The grinding of such natural talcs therefore leads irretrievably to a loss of the possibly pink or greenish original natural color of the talc.

SUMMARY OF THE INVENTION

The invention aims to propose a method which permits the preparation, simply and rapidly, of a composition comprising silicate mineral particles, the particles having coloring properties.

The invention aims also to propose a method for preparing a composition comprising phyllosilicate mineral particles, the particles having coloring properties which are not only adjustable according to the desired shade and intensity of the color but which are also durable and stable over time, starting from a composition comprising already synthesized phyllosilicate mineral particles.

Such a composition, which can serve both as a functional mineral filler and as a pigment, may be of major interest in many fields, such as the cosmetics field or the field of mineral fillers for paints.

The invention aims to propose such a method which is simple and rapid to carry out and is compatible with the constraints of industrial exploitation.

It is also an object of the invention to propose a method which makes it possible to prepare a great chemical diversity of compositions comprising mineral particles having a structure and properties similar to those of natural talcs or natural smectites, and the coloring properties of which can easily be controlled and modified.

To that end, the invention relates to a method for preparing a composition comprising silicate mineral particles which have coloring properties, wherein:

a composition, named a talcose composition, comprising phyllosilicate mineral particles is chosen from the group formed of:
   particles formed of a stack of elementary lamellae and having the chemical formula:

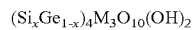

M denoting at least one divalent metal and having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], and such that $$\sum_{i=1}^{8} y(i) = 1,$$

x being a real number of the interval [0; 1],
particles formed of a stack of elementary lamellae and having at least one interfoliar space between two consecutive elementary lamellae and having the chemical formula:

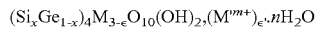
$(Si_xGe_{1-x})_4M_{3-\epsilon}O_{10}(OH)_2,(M'^{m+})_{\epsilon'}\cdot nH_2O$ M denoting at least one divalent metal and having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], and such that $$\sum_{i=1}^{8} y(i) = 1,$$

$M'^{m+}$ denoting at least one cation, named an interfoliar cation, present in at least one interfoliar space of said elementary lamellae,
x being a real number of the interval [0; 1],
$\epsilon$ being a real number of the interval [0; 3[ and denoting a cation deficit of said elementary lamellae,
$\epsilon'$ being a real number of the interval [0; 3[ and denoting a proportion of interfoliar cation(s) $M'^{m+}$ present in the interfoliar space(s) of said elementary lamellae,
m being a real number of the interval [1; 3] and denoting a cation charge of the cation $M'^{m+}$,
n referring to a number of molecule(s) of water associated with said particles, said silicate mineral particles having a thickness of less than 100 nm and the largest dimension of which is less than 10 µm,
said talcose composition is brought into contact with a solution, named a coloring solution, comprising cations, named coloring cations, of at least one element chosen from the transition metals, the lanthanides and the actinides.

The inventors have found, surprisingly, that a method according to the invention allows a talcose composition comprising mineral particles of the formula $(Si_xGe_{1-x})_4 M_3O_{10}(OH)_2$ or $(Si_xGe_{1-x})_4 M_{3-\epsilon} O_{10} (OH)_2, (M'^{m+})_{\epsilon'}\cdot nH_2O$ to be colored simply, rapidly but nevertheless durably. Accordingly, simple immersion of said talcose composition in a coloring solution comprising cations of at least one element chosen from the transition metals, the lanthanides and the actinides makes it possible to obtain a composition comprising colored phyllosilicate mineral particles. Such a method according to the invention also makes it possible to obtain a composition of phyllosilicate mineral particles having desired coloring properties, in the manner of a pigment, which can easily be adjusted in terms of intensity and shade and which allow all the colors of the visible spectrum to be covered and then remain stable over time.

The surprising effect associated with this coloring further resides in the fact that it is not possible with particles other than the silicate mineral particles according to the invention and in particular particles which have a thickness of greater than 100 nm and a largest dimension of greater than 10 µm. It would appear that the size of the silicate mineral particles is a factor which is of the utmost importance for permitting such coloring. Accordingly, the inventors have observed that it is, for example, not possible by a method according to the invention to color particles of natural talc having a thickness of greater than 200 nm, the thickness of the finest natural talcs being from 200 nm to 300 nm.

Throughout the text, the "thickness" of the silicate mineral particles denotes the smallest dimension of said particles, that is to say the dimension of said particles in direction c of the crystal lattice of said silicate mineral particles.

Throughout the text, the "largest dimension" of the silicate mineral particles denotes the largest dimension of said particles in the plane (a, b) of the crystal lattice of said silicate mineral particles.

The thickness and the largest dimension of the silicate mineral particles are measured by observation by scanning electron microscopy (SEM) or by transmission electron microscopy (TEM).

Advantageously and according to the invention, said particles have a thickness of from 1 nm to 100 nm, in particular from 5 nm to 50 nm, and the greatest dimension of which is from 20 nm to 10 µm.

The durability and irreversible nature of such a coloring step have to date still not been explained, nor has the ease with which this coloring is made possible.

The color of a composition comprising colored phyllosilicate mineral particles that is obtained by a method according to the invention can be visible to the naked eye under any type of lighting in visible light and/or by means of a detection instrument such as a spectrocolorimeter, the phyllosilicate mineral particles being able to absorb a first part of the visible spectrum and to reflect a second part thereof.

In particular, throughout the text, "colored" or "having coloring properties" denotes particles having a color, especially a color that is different from the original white color of a talcose composition, which is visible to the naked eye under any type of lighting in visible light and/or by means of a detection instrument.

The particles of the formula $(Si_xGe_{1-x})_4M_3O_{10}(OH)_2$ form a phase named the non-swelling phase. The particles of the formula $(Si_xGe_{1-x})_4 M_{3-\epsilon} O_{10} (OH)_2, (M'^{m+})_{\epsilon'}\cdot nH_2O$ form a phase named the swelling phase. Said non-swelling phase and said swelling phase are formed of a stack of elementary lamellae of the 2:1 phyllosilicate type.

Said swelling phase differs from said non-swelling phase in that it has a cation deficit of the metal M and in that it comprises interfoliar cations $M'^{m+}$ (also named "charge compensating cations") in the interfoliar space(s) of said elementary lamellae. $\epsilon$ denotes the cation deficit relating to the metal M of the elementary lamellae of said swelling phase, and $\epsilon'$ denotes a proportion of interfoliar cation(s) $M'^{m+}$ present in the interfoliar space(s) of the elementary lamellae of said swelling phase. Accordingly, advantageously and according to the invention, $\epsilon$ is a real number of the interval [0; 1]. Furthermore, advantageously and according to the invention, $\epsilon'$ is a real number of the interval [0; 1].

A method according to the invention thus allows a composition comprising colored phyllosilicate mineral particles to be obtained.

A method according to the invention allows the color that is obtained to be chosen, by the selection of the coloring cation(s) of the coloring solution, and its intensity, the intensity being dependent in particular on the concentration of coloring cations in the coloring solution, but also on the temperature and duration of the contacting between said talcose composition and the coloring solution.

Said interfoliar cation(s) $M'^{m+}$ present in the interfoliar space(s) of said elementary lamellae of said swelling phase can be of any chemical nature; they can be, for example, at least one ammonium ion $NH_4^+$, a quaternary ammonium cation such as a pyridinium cation or an imidazolium cation, or a cation $M'^{m+}$ in which M' represents at least one metal having the formula:

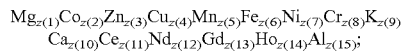
$Mg_{z(1)}Co_{z(2)}Zn_{z(3)}Cu_{z(4)}Mn_{z(5)}Fe_{z(6)}Ni_{z(7)}Cr_{z(8)}K_{z(9)}$
$Ca_{z(10)}Ce_{z(11)}Nd_{z(12)}Gd_{z(13)}Ho_{z(14)}Al_{z(15)}$;

each $z(i)$ representing a real number of the interval [0; 1], and such that $$\sum_{i=1}^{15} z(i) = 1.$$

Advantageously and according to the invention, said coloring solution is an aqueous solution.

Each coloring cation present in the coloring solution can come from any compound suitable for permitting coloring, in particular coloring which is durable over time or even irreversible, of said phyllosilicate mineral particles of the talcose composition. Each coloring cation is chosen according to the desired result, in terms of the chemical composition of the colored talcose composition and, of course, the coloring.

Advantageously and according to the invention, the coloring solution comprises coloring cations of at least one element chosen from the transition metals, the lanthanides and the actinides, and preferably from the transition metals and the lanthanides.

Advantageously and according to the invention, said coloring solution is a solution comprising at least one metal salt such as chromium salts, manganese salts, iron salts, cobalt salts, nickel salts, copper salts, zinc salts, cerium salts, neodymium salts, gadolinium salts, holmium salts, aluminium salts, and mixtures thereof. Said coloring solution is a solution of metal salt(s), for example a solution of metal chloride(s), comprising at least one metal salt which can be chosen especially from the chromium salts, such as $CrCl_3$, manganese salts, such as $MnCl_2$, iron salts, such as $FeCl_3$, cobalt salts, such as $CoCl_2$, nickel salts, such as $NiCl_2$, copper salts, such as $CuCl$, zinc salts, such as $ZnCl_2$, cerium salts, such as $CeCl_3$, neodymium salts, such as $NdCl_3$, gadolinium salts, such as $GdCl_3$, holmium salts, such as $HoCl_3$, aluminium salts, such as $AlCl_3$, potassium salts, such as $KCl$, calcium salts, such as $CaCl_2$, magnesium salts, such as $MgCl_2$, and mixtures thereof. It can also be organic salts such as carboxylates.

In particular, advantageously and according to the invention, said coloring solution is a solution comprising at least one metal salt chosen from the chromium salts, manganese salts, iron salts, cobalt salts, nickel salts, copper salts, zinc salts, cerium salts, neodymium salts, gadolinium salts, holmium salts, aluminium salts, and mixtures thereof.

In a method according to the invention, the duration of the coloring step during which said talcose composition comprising phyllosilicate mineral particles is contacted with at least one coloring cation, the concentration of each coloring cation in the coloring solution and the temperature at which this step takes place are adapted to permit fixing of the coloring cations to the phyllosilicate mineral particles of said talcose composition and therefore coloring of the talcose composition.

Advantageously and according to the invention, the duration for which said talcose composition is contacted with the coloring solution is sufficient to allow colored phyllosilicate mineral particles to be obtained. A duration of a few minutes (for example greater than 2 minutes) can be sufficient in some cases to obtain a slight coloring, especially at a sufficient temperature and in the presence of a sufficient concentration of coloring cation and optionally while subjecting the coloring solution and the talcose composition to ultrasound. Advantageously and according to the invention, said predetermined duration for which said talcose composition is contacted with a coloring solution is greater than 5 minutes, especially from 5 minutes to 7 days, in particular from 10 minutes to 24 hours, for example from 1 hour to 2 hours.

Advantageously and according to the invention, the concentration of the coloring cation(s) present in the coloring solution is chosen taking into account especially the temperature, the duration of contacting with the talcose composition, the nature of the talcose composition and the nature of the coloring cation(s) used, said concentration of the coloring cation(s) being chosen so as to be sufficient to allow colored phyllosilicate mineral particles to be obtained. Advantageously and according to the invention, the concentration of the coloring cation(s) present in the coloring solution is from 0.2 mol/L to the saturation concentration of the metal salt corresponding to the coloring cation(s). The concentration of the coloring cation(s) present in the coloring solution is, for example, from 0.2 mol/L to 5 mol/L.

The coloring step can be carried out at any temperature at which the coloring solution is in the liquid state and which allows colored phyllosilicate mineral particles to be obtained. Advantageously and according to the invention, the coloring step takes place at a temperature of from 5° C. to 100° C. The contacting which takes place in this step of a method according to the invention can be carried out, for example, at ambient temperature (from 20° C. to 25° C.) or at a temperature slightly above ambient temperature, especially from 30° C. to 90° C. and, for example, from 40° C. to 70° C., according to the nature of the coloring cations and the phyllosilicate mineral particles to be colored, as well as the shade and intensity of the desired color.

The coloring step can be carried out with or without stirring of the coloring composition to which the talcose composition is added. It is possible, for example, to stir the coloring solution manually (for example by means of a metal rod) for only a few moments at the time of adding the talcose composition to the coloring solution and then leave it at rest for the remainder of the coloring step. Advantageously and according to the invention, said talcose composition comprising phyllosilicate mineral particles is contacted with the coloring solution with stirring, for example with mechanical stirring by means of a magnetic stirrer. For example, a slow stirring speed is generally sufficient to permit contacting between the coloring cation(s) and the talcose composition which allows colored phyllosilicate mineral particles to be obtained.

At the end of the coloring step of a method according to the invention, the talcose composition comprising colored phyllosilicate mineral particles that is obtained can be recovered by removing the aqueous coloring solution. The aqueous coloring solution can be removed, for example, after natural decantation of said talcose composition comprising colored phyllosilicate mineral particles and removal of the supernatant solution, or alternatively by centrifugation of the coloring solution comprising said colored talcose composition that is obtained. The recovered talcose composition comprising colored phyllosilicate mineral particles can then be rinsed in order to remove the residual cations. The recovered talcose composition comprising colored phyllosilicate mineral particles can likewise be stored and used without being rinsed. Accordingly, advantageously, in a method according to the invention, following the coloring step, the colored phyllosilicate mineral particles that are obtained are rinsed with an aqueous solution which is at least substantially free of coloring cations and in particular free of coloring cations (that is to say cations of at least one element chosen from the transition metals, the lanthanides and the actinides).

At the end of the coloring step of a method according to the invention, the talcose composition comprising colored phyllosilicate mineral particles can be stored or used as it is, in the form of a gel or aqueous suspension, or alternatively it can be dried in order to remove at least in part the aqueous solution, especially water, still present. Advantageously and according to the invention, the colored phyllosilicate mineral particles that are obtained are dried after contacting said talcose composition with at least one coloring cation, and before or after optional rinsing. Drying can be carried out by any drying means that permits removal of the aqueous solution. Drying can be carried out, for example, directly in an oven (for example at a temperature of approximately 100° C.), by spraying, by drying by irradiation with microwaves or alternatively by lyophilization. Advantageously and according to the invention, the talcose composition comprising colored phyllosilicate mineral particles is dried at a temperature of from 60° C. to 200° C.

In particular, a step of drying in an oven at a temperature of approximately 100° C. or 120° C. allows the color of the colored phyllosilicate mineral particles to be intensified or shaded to a greater or lesser degree, according to the nature of the coloring cation(s) especially.

Furthermore, it is possible to repeat at least once said coloring step in which the talcose composition is contacted with the coloring solution. In this manner, it is possible to modify or shade to a greater or lesser degree the color of such a composition in order to obtain the desired coloring.

Furthermore, advantageously and according to the invention, the talcose composition can be formed by an interstratification between said swelling phase and said non-swelling phase. Such an interstratification is also named a T.O.T.-swelling T.O.T. interlayer. Advantageously and according to the invention, said phyllosilicate mineral particles are prepared by a hydrothermal treatment of a composition comprising particles of the formula $(Si_xGe_{1-x})_4 M_3 O_{11}$, n'$H_2O$.

Advantageously and according to the invention, said hydrothermal treatment is carried out for a duration of from 30 minutes to 60 days and at a temperature of from 150° C. to 600° C.

In particular, advantageously and according to the invention, said starting talcose composition is obtained by hydrothermal treatment of a gel containing silicon and/or germanium and metal of the chemical formula $(Si_xGe_{1-x})_4 M_3 O_{11}$, n'$H_2O$, said hydrothermal treatment being carried out at a temperature of from 150° C. to 300° C.

Advantageously and according to the invention, the hydrothermal treatment of said gel containing silicon and/or germanium and metal is carried out by means of an autoclave. It can be, for example, an autoclave formed of a nickel-based alloy such as Hastelloy® (marketed by Haynes International, Kokomo, United States) or an autoclave made of titanium or optionally made of steel with a polytetrafluoroethylene (PTFE) lining in a case where the hydrothermal treatment temperature does not exceed 250° C. Such an autoclave can have any capacity, for example a capacity ranging from 200 milliliters to 50 liters.

Advantageously and according to the invention, said hydrothermal treatment is carried out with stirring. To that end there can be used, for example, an autoclave equipped with an internal metal screw.

Advantageously and according to the invention, said hydrothermal treatment is carried out under saturation vapor pressure. Advantageously and according to the invention, there is added to the autoclave with said hydrogel containing silicon and/or germanium and metal a quantity of water (preferably distilled water) that is at least sufficient to create a saturation vapor atmosphere inside the autoclave brought to the treatment temperature.

Advantageously and according to the invention, for a given temperature and hydrothermal treatment duration, a further addition of water to said gel containing silicon and/or germanium and metal is carried out in order to adjust the water/solid ratio representative of the reaction mixture based on gel containing silicon and/or germanium and metal that is to be treated, according to the ratio by volume—swelling mineral phase/non-swelling mineral phase—desired for the T.O.T.-swelling T.O.T. interlayer particles.

Furthermore, advantageously and according to the invention, at the end of at least said coloring step, said composition comprising colored phyllosilicate mineral particles that is obtained is subjected to heat treatment for a predetermined duration and at a temperature of from 200° C. to 600° C., especially from 300° C. to 600° C.

Advantageously and according to the invention, said heat treatment can be carried out at low pressure, especially at a pressure below 5 bar, in particular at atmospheric pressure, and in ambient air. Such a heat treatment allows a composition comprising colored phyllosilicate mineral particles having at least one swelling phase to be converted in a very simple manner into a composition comprising colored phyllosilicate mineral particles having at least one non-swelling phase, that is to say a composition comprising phyllosilicate mineral particles of the formula $(Si_xGe_{1-x})_4M_3O_{10}(OH)_2$ which is colored and structurally very similar to a natural talc composition. Such a colored talcose composition can advantageously replace a natural talc composition in various applications.

Such a heat treatment can likewise allow the color of the colored phyllosilicate mineral particles to be shaded and modified to a greater or lesser degree. Heat treatment at 250° C. of phyllosilicate mineral particles of the formula $Si_4Mg_3O_{10}(OH)_2$ colored with cobalt (Co), for example, allows the color to be changed from a pink color to a dark pink to brown color.

Furthermore, advantageously and according to the invention, said heat treatment is carried out in an atmosphere with controlled humidity, and in particular it is an anhydrous heat treatment.

The invention extends to a composition obtainable by a method according to the invention. A composition according to the invention comprises phyllosilicate mineral particles which have coloring properties and belong to the group formed of:

particles formed of a stack of elementary lamellae and having the chemical formula:

$$(Si_xGe_{1-x})_4M_3O_{10}(OH)_2$$

M denoting at least one divalent metal and having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], and such that $$\sum_{i=1}^{8} y(i) = 1,$$

x being a real number of the interval [0; 1],
particles formed of a stack of elementary lamellae and having at least one interfoliar space between two consecutive elementary lamellae and having the chemical formula:

$(Si_xGe_{1-x})_4M_{3-\epsilon}O_{10}(OH)_2,(M'^{m+})_{\epsilon'}\cdot nH_2O$

M denoting at least one divalent metal and having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], and such that $$\sum_{i=1}^{8} y(i) = 1,$$

$M'^{m+}$ denoting at least one cation, named an interfoliar cation, present in at least one interfoliar space of said elementary lamellae,
x being a real number of the interval [0; 1],
ε being a real number of the interval [0; 3[ and denoting a cation deficit of said elementary lamellae,
ε' being a real number of the interval [0; 3[ and denoting a proportion of interfoliar cation(s) $M'^{m+}$ present in the interfoliar space(s) of said elementary lamellae of said swelling phase,
m being a real number of the interval [1; 3] and denoting a cation charge of the cation $M'^{m+}$,
n referring to a number of molecule(s) of water associated with said particles, said silicate mineral particles having a thickness of less than 100 nm and the largest dimension of which is less than 10 μm.

A composition according to the invention has high chemical stability. Furthermore, such compositions according to the invention can have different colors according to the chemical nature of the coloring cations fixed to the phyllosilicate mineral particles. Compositions comprising colored phyllosilicate mineral particles, according to the invention, can be of any color, more or less light or dark and more or less intense.

A composition comprising colored phyllosilicate mineral particles according to the invention can be obtained by a method for preparing a talcose composition comprising phyllosilicate mineral particles according to the invention.

Advantageously, a composition according to the invention comprises colored phyllosilicate mineral particles formed of an interstratification between said swelling phase and said non-swelling phase.

In particular, the invention relates to a composition obtained by a method according to the invention.

The invention relates also to a method for preparing a composition comprising colored silicate mineral particles and to a talcose composition comprising colored phyllosilicate mineral particles, characterized in combination by all or some of the features mentioned hereinabove or hereinbelow.

BRIEF DESCRIPTION OF THE DRAWING

The sole FIGURE shows diffractograms corresponding to the X-ray diffraction analysis carried out on nine colored compositions obtained by a method according to the invention, starting from talcose compositions comprising phyllosilicate mineral particles, with different coloring cations.

DETAILED DESCRIPTION OF THE INVENTION

Other objects, advantages and feature of the invention will become apparent upon reading the description and examples which follow and which refer to the single feature.

A talcose composition used in a method according to the invention can be prepared, for example, by the following synthesis protocol.

A/—General Protocol for the Synthesis of a Talcose Composition Used in a Method According to the Invention 1/—Preparation of a Gel Containing Silicon and/or Germanium and Metal According to a first variant, the gel containing silicon and/or germanium and metal is prepared by a coprecipitation according to the following reaction equation:

$$4\begin{pmatrix}(Na_2OSiO_2)_x\\(Na_2OGeO_2)_{1-x}\end{pmatrix} + 2HCl + mH_2O +$$

$$3\begin{Bmatrix}y_{(1)}(MgCl_2) + y_{(2)}(CoCl_2) + y_{(3)}(ZnCl_2) +\\y_{(4)}(CuCl_2) + y_{(5)}(MnCl_2) + y_{(6)}(FeCl_2) +\\y_{(7)}(NiCl_2) + y_{(8)}(CrCl_2)\end{Bmatrix} \longrightarrow$$

$$[Si_xGe_{1-x}]_4M_3O_{11}\cdot n'H_2O] + 8NaCl + (m - n' + 1)H_2O$$

This coprecipitation reaction allows a hydrated gel containing silicon and/or germanium and metal and having the stoichiometry of talc (4 atoms of silicon (Si) and/or germanium (Ge) for 3 atoms of said divalent metal M) to be obtained.

It is carried out starting from:
1. an aqueous solution of penta-hydrated sodium metasilicate or an aqueous solution of sodium metagermanate, or a mixture of these two solutions in the molar proportions x/(1−x),
2. a metal chloride solution prepared with one or more metal salt(s) (in the form of hygroscopic crystals) diluted in distilled water, and
3. a 1N hydrochloric acid solution.

The gel containing silicon and/or germanium and metal is prepared according to the following protocol:
1. the hydrochloric acid solution and the metal chloride(s) solution are mixed,
2. this mixture is added to the sodium metasilicate and/or sodium metagermanate solution; the coprecipitation gel forms instantly,
3. the gel is recovered after centrifugation (at 7000 revolutions/minute for 15 minutes) and removal of the supernatant (sodium chloride solution that has formed),
4. the gel is washed with distilled or osmozed water or with tap water (at least two washing/centrifugation cycles are necessary).

According to a second variant, the gel containing silicon and/or germanium and metal can be prepared by a coprecipitation reaction involving, as reagent, at least one compound comprising silicon, at least one dicarboxylate salt of the formula $M(R_1—COO)_2$ ($R_1$ being chosen from H and alkyl groups having fewer than 5 carbon atoms) in the presence of at least one carboxylate salt of the formula $R_2$—COOX wherein X denotes a metal chosen from the group formed of Na and K, and $R_2$ is chosen from H and alkyl groups having fewer than 5 carbon atoms.

This coprecipitation reaction allows a hydrated hydrogel containing silicon and/or germanium and metal and having the stoichiometry of talc (4 Si/Ge for 3 M, M having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], and such that $$\sum_{i=1}^{8} y(i) = 1)$$

to be obtained.

The hydrogel containing silicon and/or germanium and metal is prepared by a coprecipitation reaction carried out starting from:
1. an aqueous solution of penta-hydrated sodium metasilicate or an aqueous solution of sodium metagermanate, or a mixture of these two solutions in the molar proportions x/(1−x),
2. a solution of dicarboxylate salt(s) prepared with one or more dicarboxylate salt(s) of the formula $M(R_1—COO)_2$ diluted in a carboxylic acid, such as acetic acid, and
3. a solution of carboxylate salt(s) prepared with one or more carboxylate salt(s) of the formula $R_2$—COOX diluted in distilled water.

The hydrogel containing silicon and/or germanium and metal is prepared according to the following protocol:
1. the sodium metasilicate solution and the solution of carboxylate salt(s) of formula $R_2$—COOX are mixed,
2. the solution of dicarboxylate salt(s) of the formula $M(R_1—COO)_2$ is added quickly thereto; the coprecipitation hydrogel forms instantly.

At the end of this first phase, a hydrated gel containing silicon and/or germanium and metal —$(Si_xGe_{1-x})_4M_3O_{11}$, n'$H_2O$— of gelatinous consistency is obtained (optionally in the presence of the carboxylate salt(s) of the formulae $R_2$—COOX and $R_1$—COOX in the case of the second variant). The gel has thixotropic behavior, that is to say it passes from a viscous state to a liquid state when it is stirred and then returns to its original state if it is allowed to rest for a sufficient time.

The gel containing silicon and/or germanium and metal can also be recovered after centrifugation (for example from 3000 to 15,000 revolutions per minute for from 5 to 60 minutes) and removal of the supernatant, optionally washing with demineralized water (for example two successive washings and centrifugations) and then drying, for example in an oven (60° C., 2 days), by lyophilization, by spray drying or by drying under microwave irradiation. The particles containing silicon and/or germanium and metal of the formula $(Si_xGe_{1-x})_4M_3O_{11}$, n'$H_2O$ can thus be stored in the form of a powder with a view to a subsequent hydrothermal treatment. The particles containing silicon and/or germanium and metal that are obtained are, if necessary, ground by means of a mortar (for example an agate mortar) in order to obtain a homogeneous powder.

2/—Hydrothermal Treatment of the Gel Containing Silicon and/or Germanium and Metal The gel containing silicon and/or germanium and metal as obtained hereinbefore is subjected to a hydrothermal treatment at a temperature of from 150° C. to 600° C., and especially at a temperature of from 150° C. to 400° C.

In order to carry out the hydrothermal treatment:
1. the gel is placed in a reactor (of 400 ml); the water/solid ratio is optionally adjusted by adding water, especially in order to avoid calcination of the solid fraction); in order to avoid any problem of leakage from the reactor, the reactor is filled to ⅔ of its volume,
2. there is optionally added, with stirring, a solution comprising at least one carboxylate salt of the formula $R_2$—COOX, in hydrated or anhydrous form, X denoting a metal chosen from the group formed of Na and K, and $R_2$ being chosen from H and alkyl groups having fewer than 5 carbon atoms,
3. the reactor is placed inside an oven or conduction oven at the reaction temperature (established at from 150° C. to 600° C., in particular from 150° C. to 400° C.) throughout the treatment (from 30 minutes to 60 days).

At the end of this hydrothermal treatment, a colloidal talcose composition comprising phyllosilicate mineral particles, in solution in water, is obtained. The mineral particles obtained at the end of this hydrothermal treatment can in particular be T.O.T.-swelling T.O.T. interlayer particles.

The carboxylate salt optionally present during the hydrothermal treatment can be added at the time said hydrothermal treatment is carried out and/or can be obtained from the precipitation medium of the gel containing silicon and/or germanium and metal according to the second variant for the preparation of the gel containing silicon and/or germanium and metal. Carrying out the hydrothermal treatment in the presence of a carboxylate salt allows the reaction of converting the gel containing silicon and/or germanium and metal into a talcose composition comprising phyllosilicate mineral particles to be improved, especially by accelerating it. In the case where the hydrothermal treatment is carried out in the presence of such a carboxylate salt, the temperature inside the oven or autoclave is from 150° C. to 400° C.

At the end of this hydrothermal treatment, the contents of the reactor are recovered after filtration and/or optionally centrifugation (for example at from 3000 to 15,000 revolutions per minute for from 5 to 60 minutes) and removal of the supernatant. The recovered talcose composition is optionally dried, for example in an oven (60° C., 2 days), by lyophilization, by spray drying or by drying under microwave irradiation.

At the end of such a hydrothermal treatment there is obtained a divided solid composition comprising, for example, T.O.T.-swelling T.O.T. interlayer particles having the formula:

$Si_4Mg_3O_{10}(OH)_2/Si_4Mg_{3-\epsilon}O_{10}(OH)_2,(Mg^{2+})\epsilon'.nH_2O,$ $Si_4Ni_3O_{10}(OH)_2/Si_4Ni_{3-\epsilon}O_{10}(OH)_2,(Ni^{2+})\epsilon'.nH_2O,$ $Si_4Co_3O_{10}(OH)_2/Si_4Co_{3-\epsilon}O_{10}(OH)_2,(Co^{2+})\epsilon'.nH_2O,$ $Si_4Cu_3O_{10}(OH)_2/Si_4Cu_{3-\epsilon}O_{10}(OH)_2,(Cu^{2+})\epsilon'.nH_2O,$ $Si_4Mn_3O_{10}(OH)_2/Si_4Mn_{3-\epsilon}O_{10}(OH)_2,(Mn^{2+})\epsilon'.nH_2O,$ $Si_4Fe_3O_{10}(OH)_2/Si_4Fe_{3-\epsilon}O_{10}(OH)_2,(Fe^{2+})\epsilon'.nH_2O,$ or $Si_4Zn_3O_{10}(OH)_2/Si_4Zn_{3-\epsilon}O_{10}(OH)_2,(Zn^{2+})\epsilon'.nH_2O,$ according to the nature of the metal chloride(s) used for the preparation of the gel containing silicon and/or germanium and metal (and also, where appropriate, the respective proportions of those metal chlorides).

B/—Method for Preparing a Talcose Composition Comprising Colored Phyllosilicate Mineral Particles According to the Invention The phyllosilicate mineral particles, for example T.O.T.-swelling T.O.T. interlayer particles as obtained hereinbefore, are contacted with a solution, named a coloring solution, comprising at least one coloring cation of an element chosen from the transition metals, the lanthanides and the actinides. To that end:

1. the previously dried (for example in an oven) phyllosilicate mineral particles are placed in an aqueous solution in which there is dissolved a coloring salt, as defined hereinbefore, for a predetermined duration of from 5 minutes to 7 days, with or without stirring, the concentration of the salt in the solution being predetermined and being from 0.2 mol/L to 5 mol/L,
2. the phyllosilicate mineral particles are recovered by centrifugation of the solution, for example for 10 minutes at 3500 revolutions/minute, and removal of the supernatant solution,
3. optionally, the phyllosilicate mineral particles are rinsed one to two times with distilled water, by centrifugation, for example for 10 minutes at 3500 revolutions/minute, and removal of the supernatant solution each time, in order to remove excess coloring cations, and
4. the phyllosilicate mineral particles that are obtained are dried, for example for 12 hours in an oven at 100° C.

Examples 1 to 11

10 samples of T.O.T.-swelling T.O.T. interlayer particles $Si_4M_3O_{10}(OH)_2/(Si_xGe_{1-x})_4M_{3-\epsilon}O_{10}(OH)_2$, $(M'^{m+})_{\epsilon'}.nH_2O$ are thus prepared:

starting from T.O.T.-swelling T.O.T. interlayer particles $Si_4Mg_3O_{10}(OH)_2/Si_4Mg_{3-\epsilon}O_{10}(OH)_2$, $(Mg^{2+})\epsilon'.nH_2O$ and using as the coloring salt $CrCl_3$, $MnCl_2$, $FeCl_3$, $CoCl_2$, $NiCl_2$, $CuCl$, $CeCl_3$, $NdCl_3$ and $HoCl_3$ (samples 1 to 9) and starting from T.O.T.-swelling T.O.T. interlayer particles $Si_4Ni_3O_{10}(OH)_2/Si_4Ni_{3-\epsilon}O_{10}(OH)_2$, $(Ni^{2+})\epsilon'.nH_2O$ and using $FeCl_3$ as the coloring salt (sample 10).

There is used 1 gram of the T.O.T.-swelling T.O.T. interlayer particles $Si_4Mg_3O_{10}(OH)_2/Si_4Mg_{3-\epsilon}O_{10}(OH)_2$, $(Mg^{2+})\epsilon'.nH_2O$ or $Si_4Ni_3O_{10}(OH)_2/Si_4Ni_{3-\epsilon}O_{10}(OH)_2$, $(Ni^{2+})\epsilon'.nH_2O$ previously dried in an oven in 40 ml of an aqueous solution in which a coloring salt is dissolved in a concentration of 1 mol/L, for one hour, with stirring.

Sample 11 corresponds to a T.O.T.-swelling T.O.T interlayer $Si_4Mg_3O_{10}(OH)_2/Si_4Mg_{3-\epsilon}O_{10}(OH)_2$, $(Mg^{2+})\epsilon'.nH_2O$ which has not been subjected to a coloring step according to the invention.

The 11 samples were prepared according to the first variant for the preparation of the gel containing silicon and/or germanium and metal, followed by a hydrothermal treatment for 48 hours at 160° C.

The mineral T.O.T.-swelling T.O.T. interlayer particles of samples 1 to 11 have a thickness of less than 10 nm and a largest dimension of less than 50 nm. In particular, they have, for the majority, a thickness of less than 5 nm and a largest dimension of less than 30 nm. The thickness and the largest dimension of said particles were measured by observation with a transmission electron microscope (TEM).

In Table 1 there are recorded, for each of samples 1 to 10 of T.O.T.-swelling T.O.T. interlayer particles, the nature of the element M, the nature of the coloring cation Z, the concentration by mass [Z] of coloring cation $Z^{P+}$ in said T.O.T.-swelling T.O.T. interlayer particles measured by means of a Cameca SX50® electron microprobe, the atomic ratio of coloring cation Z to silicon atoms (Z/Si), and the color obtained.

TABLE 1

| M | Z | [Z] (wt. %) | Atomic ratio Z/Si | Color | Sample no. |
|---|---|---|---|---|---|
| Mg | Cr | 2.1 | 0.036 | grey-green | 1 |
| Mg | Mn | 3.3 | 0.061 | brown | 2 |
| Mg | Fe | 4.1 | 0.070 | ochre | 3 |
| Mg | Co | 4.0 | 0.072 | pink | 4 |
| Mg | Ni | 4.6 | 0.076 | light green | 5 |
| Mg | Cu | 5.2 | 0.085 | blue | 6 |
| Mg | Ce | 7.1 | 0.060 | yellow | 7 |
| Mg | Nd | 6.6 | 0.054 | very light pink | 8 |
| Mg | Ho | 7.3 | 0.058 | very light pink | 9 |
| Ni | Fe | 2.2 | 0.047 | green | 10 |
| Mg | — | — | — | white | 11 |

Examples 12 to 21

Samples 12 to 21 were prepared according to the first variant for the preparation of the gel containing silicon and/or germanium and metal, followed by a hydrothermal treatment at 300° C. for 3 days (72 hours) for samples 12 to 14 and at 300° C. for 6 hours for samples 15 to 21.

There is used 0.5 gram of phyllosilicate mineral particles previously dried in an oven in 40 ml of an aqueous solution in which a coloring salt is dissolved in a molar concentration $[Z]_2$, for a duration $\Delta t_2$, with stirring.

The coloring step for samples 12 to 21 is carried out in accordance with steps 1 to 3 described above, and the colored phyllosilicate mineral particles obtained are then dried in an oven at 110° C., for 12 hours for samples 12 to 15 and for 36 hours for samples 16 to 21.

Furthermore, during the coloring step, samples 12 to 15 were subjected to ultrasound for the last 20 minutes of this step. Sample 15 was also subjected to ultrasound for one hour at the start of the coloring step. In addition, sample 17 was subjected to ultrasound for 3 minutes at the start of the coloring step and five times for 3 minutes during the coloring step.

The phyllosilicate mineral particles of samples 12 to 21 have a thickness of less than 50 nm and a largest dimension of less than 200 nm. The thickness and the largest dimension of said particles were measured by observation with a transmission electron microscope (TEM).

In Table 2 there are recorded, for each of samples 12 to 21, the nature of the element M of the phyllosilicate mineral particles, the nature of the coloring cation Z, the molar concentration $[Z]_2$ of coloring cation $Z^{P+}$ in the coloring solution, the duration $\Delta t_2$ of the coloring step, and the color obtained.

TABLE 2

| M | Z | $[Z]_2$ (mol · L$^{-1}$) | $\Delta t_2$ | Color | Sample no. |
|---|---|---|---|---|---|
| Mg | Ni | 3 | 6 days | light green | 12 |
| Ni | Ni | 3 | 6 days | light green | 13 |
| Co | Ni | 3 | 6 days | pink | 14 |

TABLE 2-continued

| M | Z | $[Z]_2$ (mol·L$^{-1}$) | $\Delta t_2$ | Color | Sample no. |
|---|---|---|---|---|---|
| Mg | Ni | 3 | 7 days | very light green | 15 |
| Mg | Ni | 3 | 4 days | light green | 16 |
| Mg | Ni | 3 | 4 days | light green | 17 |
| Mg | Ni | 1 | 4 days | light green | 18 |
| Mg | Mn | 1 | 4 days | brown | 19 |
| Mg | Co | 1 | 4 days | beige | 20 |
| Mg | Fe | 1 | 4 days | ochre | 21 |

Examples 22 to 25

Samples 22 to 25 were prepared according to the first variant of the preparation of the gel containing silicon and/or germanium and metal, followed by a hydrothermal treatment at a temperature $T_3$ for a duration $\Delta t_3$.

The coloring step for samples 22 to 25 is carried out in accordance with steps 1 to 3 described above. There is used 0.6 gram of phyllosilicate mineral particles for sample 22 (starting from a gel having a solids content of 10%) and 1 gram of phyllosilicate mineral particles previously dried in an oven for samples 23 to 25, in 40 ml of an aqueous solution in which a coloring salt is dissolved in a molar concentration of 1 mol/L, for 30 minutes, with stirring. The recovered particles were then dried in an oven at 110° C. for 48 hours.

Furthermore, during the coloring step, samples 22, 23 and 24 were at the same time subjected to ultrasound. The temperature at which the coloring step is carried out for samples 22, 23 and 24 is 20° C. Sample 25 was not subjected to ultrasound during the coloring step. The temperature at which the coloring step is carried out for sample 25 is 80° C.

The phyllosilicate mineral particles of samples 22 to 25 have a thickness of less than 50 nm and a largest dimension of less than 200 nm. The thickness and the largest dimension of said particles were measured by observation with a transmission electron microscope (TEM).

In Table 3 there are recorded, for each of samples 22 to 25 of phyllosilicate mineral particles, the nature of the element M, the nature of the coloring cation Z, the temperature $T_3$ and the duration $\Delta t_3$ of the hydrothermal treatment by which the phyllosilicate mineral particles were prepared, and the color obtained after the coloring step.

TABLE 3

| M | Z | $T_3$ (° C.) | $\Delta t_3$ | Color | Sample no. |
|---|---|---|---|---|---|
| Mg | Ni | 300 | 6 hours | light green | 22 |
| Mg | Ni | 220 | 2 days | light green | 23 |
| Mg | Ni | 160 | 2 days | light green | 24 |
| Mg | Ni | 160 | 2 days | green | 25 |

Examples 26 to 29

Samples 26 to 29 were prepared according to the first variant of the preparation of the gel containing silicon and/or germanium and metal, followed by a hydrothermal treatment at 160° C. for 3 days (72 hours) for samples 26, 27 and 29 and at 160° C. for 2 days (48 hours) for sample 28.

There is used 1 gram of phyllosilicate mineral particles for samples 26 and 27 and 2 grams of phyllosilicate mineral particles for samples 28 and 29. The phyllosilicate mineral particles previously dried in an oven are contacted with 40 ml of an aqueous solution in which a coloring salt is dissolved in a molar concentration $[Z]_2$, for a duration $\Delta t_2$, with stirring.

The coloring step for samples 26 to 29 is carried out in accordance with steps 1 to 3 described above, and the colored phyllosilicate mineral particles obtained are then dried in an oven at 110° C. for 12 hours for samples 26 and 27 and at 110° C. for 24 hours for samples 28 and 29.

Furthermore, at the start of the coloring step, samples 28 and 29 were subjected to ultrasound for 2 minutes.

The phyllosilicate mineral particles of samples 26 to 29 have a thickness of less than 50 nm and a largest dimension of less than 200 nm. The thickness and the largest dimension of said particles were measured by observation with a transmission electron microscope (TEM).

In Table 4 there are recorded, for each of samples 26 to 29, the nature of the element M of the phyllosilicate mineral particles, the nature of the coloring cation Z, the molar concentration $[Z]_2$ of coloring cation $Z^{P+}$ in the coloring solution, the duration $\Delta t_2$ of the coloring step, and the color obtained.

TABLE 4

| M | Z | $[Z]_2$ (mol·L$^{-1}$) | $\Delta t_2$ | Color | Sample no. |
|---|---|---|---|---|---|
| Ni | Fe | 1 | 60 minutes | green | 26 |
| Ni | Ni | 1 | 2 hours | green | 27 |
| Mg | Co | 1 | 2 hours | pink to violet | 28 |
| Ni | Co | 1 | 2 hours | green | 29 |

Such compositions comprising colored phyllosilicate mineral particles are of particular interest, for example, in the cosmetics field. It is possible, for example, to envisage using these particles in cosmetic compositions for care and/or make-up, as mineral fillers and/or as a coloring agent. Such compositions of colored phyllosilicate mineral particles will further allow organic pigments to be reduced or replaced.

Comparative Example

By way of comparative example, particles of a pure natural talc obtained from the Trimouns quarry (Luzenac, France) having a thickness of greater than 300 nm and the largest dimension of which is greater than 20 μm were contacted with coloring cations in a coloring step according to the invention.

Said natural talc particles (1 gram) are placed in 40 ml of an aqueous solution in which a coloring salt (NiCl$_2$) is dissolved, for 30 minutes with stirring and then for 5 hours at rest. The concentration of the coloring salt in the solution is 1 mol/L. After centrifugation for 5 minutes at 7000 revolutions/minute and removal of the supernatant solution, the natural talc particles are dried at 120° C. for 12 hours. The talc particles are then rinsed with distilled water, and then the solution is centrifuged for 5 minutes at 9000 revolutions/minute. The supernatant that has been removed is cloudy and green in color. The natural talc particles that are recovered are white. After drying, natural talc particles having a color identical to their original color, that is to say white, are obtained.

A coloring step according to the invention carried out on natural talc particles having a thickness of greater than 100 nm and the largest dimension of which is greater than 10 μm therefore does not allow colored silicate mineral particles to be obtained.

C/—Structural Analysis and Characterization

In X-ray (XR) diffraction, a natural talc such as a talc from the ARNOLD mine (New York state, USA) is known to exhibit the following characteristic diffraction lines (according to the publication of Ross M., Smith W. L. and Ashton W. H., 1968, *"Triclinic talc and associated amphiboles from Gouverneur mining district, New York; American Mineralogist"*, Volume 53, pages 751-769):

for the plane (001), a line situated at a distance of 9.34 Å;
for the plane (002), a line situated at a distance of 4.68 Å;
for the plane (020), a line situated at a distance of 4.56 Å;
for the plane (003), a line situated at a distance of 3.115 Å;
for the plane (060), a line situated at a distance of 1.52 Å.

The single FIGURE shows the results of analyses carried out by X-ray diffraction obtained with the above compositions.

The diffractograms were recorded on a CPS 120 device marketed by INEL (Artenay, France). This is a diffractometer with a curved detector, allowing detection in real time over an angle domain of 120°. The acceleration voltage used is 40 kV and the intensity 25 mA. The Bragg equation giving the structural equidistance is: $d_{hkl}=0.89449/\sin\theta$ (with the use of a cobalt anticathode).

The XR diffractograms of samples 1, 2, 3, 4, 5, 6, 7, 8 and 9 are shown by curves 1, 2, 3, 4, 5, 6, 7, 8 and 9, respectively, of the single FIGURE. Curve 11 of the single FIGURE shows the XR diffractogram of T.O.T.-swelling T.O.T. interlayer particles $Si_4Mg_3O_{10}(OH)_2/Si_4Mg_{3-\epsilon}O_{10}(OH)_2$, $(Mg^{2+})\epsilon'.nH_2O$ which have not been subjected to a method according to the invention (that is to say before coloring and removal of the aqueous solution: sample 11). These analyses therefore confirm that no new phase is formed during the coloring method according to the invention.

The only differences to be noted between curve 11 and curves 1 to 9 consists in the existence, on curve 11, of lines situated at 370 and at 53° representing the presence of salts obtained from the hydrothermal treatment medium. These salts have been removed in the coloring solution and by rinsing as regards samples 1 to 9.

D/—Heat Treatment of T.O.T.-Swelling T.O.T. Interlayer Compositions

A colored T.O.T.-swelling T.O.T. interlayer composition prepared as described above, after drying and grinding, can be subjected to anhydrous heat treatment for a duration of from 30 minutes to 24 hours, especially from 1 hour to 10 hours, and at a temperature of from 300° C. to 600° C., especially from 500 to 550° C. To that end, the composition is placed in a platinum crucible and is then heated. It is also possible to use a crucible made of ceramics or any other suitable material. The reaction is carried out at low pressure, below 5 bar, especially at atmospheric pressure.

The crystalline and lamellar structures of the colored T.O.T.-swelling T.O.T. interlayer particles obtained during and at the end of the implementation of the method defined hereinbefore followed by heat treatment were characterized by X-ray diffraction.

The results of these analyses confirm the possibility of obtaining colored talcose compositions by heat treatment of compositions of colored T.O.T.-swelling T.O.T. interlayer particles. The color of the colored talcose compositions that are obtained remains the same after heat treatment but may be darker than that of the corresponding colored T.O.T.-swelling T.O.T. interlayer particles, before heat treatment.

E/—Characterization of the Stability of the Coloring of the Colored Phyllosilicate Mineral Particles According to the Invention The stability and durability of the coloring of the T.O.T.-swelling T.O.T. interlayer particles $Si_4Mg_3O_{10}(OH)_2/Si_4Mg_{3-\epsilon}O_{10}(OH)_2$, $(Mg^{2+})\epsilon'.nH_2O$ colored by contacting with $MnCl_2$ (sample 2) were tested in distilled water.

1 gram of particles of sample 2 is placed in a beaker containing distilled water. The solution is mixed mechanically for 1 minute and then subjected to ultrasound for 30 seconds. The aqueous solution of brown-colored silicate mineral particles is allowed to rest for 12 hours. After 12 hours without stirring, the brown-colored silicate mineral particles form a deposit at the bottom of the beaker and the supernatant aqueous solution is clear.

It has thus been observed that the dissolution of the colored silicate mineral particles according to the invention does not lead to a loss of the coloration thereof, and that the coloration obtained is stable and durable.

The invention can be the subject of many other applications and of different variants with respect to the embodiment described above. In particular, the element Z can be any other chemical element having a different formula from those which have been mentioned by way of example above and which allow compositions of phyllosilicate mineral particles to be obtained which have different colors from those mentioned above. A plurality of different coloring cations can likewise be used simultaneously in the same coloring solution or in succession.

The invention claimed is:

1. A method for preparing a composition comprising silicate mineral particles which have coloring properties, wherein:

a talcose composition, comprising phyllosilicate mineral particles is selected from the group consisting of:

particles formed of a stack of elementary lamellae and having the chemical formula:

$$(Si_xGe_{1-x})_4M_3O_{10}(OH)_2$$

M denoting at least one divalent metal and having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], and such that

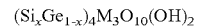

$$\sum_{i=1}^{8} y(i) = 1,$$

x being a real number of the interval [0; 1], and particles formed of a stack of elementary lamellae and having at least one interfoliar space between two consecutive elementary lamellae and having the chemical formula:

$$(Si_xGe_{1-x})_4M_{3-\epsilon}O_{10}(OH)_2,(W^{M+})_\epsilon.nH_2O$$

M denoting at least one divalent metal and having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], and such that

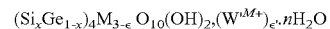

$$\sum_{i=1}^{8} y(i) = 1,$$

M'$^{m+}$ denoting at least one cation, named an interfoliar cation, present in at least one interfoliar space of said elementary lamellae, x being a real number of the interval [0; 1], ε being a real number of the interval [0; 3[ and denoting a cation deficit of said elementary lamellae, ε' being a real number of the interval [0; 3[ and denoting a proportion of interfoliar cation(s) M'$^{m+}$ present in the interfoliar space(s) of said elementary lamellae, m being a real number of the interval [1; 3] and denoting a cation charge of the cation M'$^{m+}$, n referring to a number of molecule(s) of water associated with said particles, said silicate mineral particles having a thickness of less than 100 nm and the largest dimension of which is less than 10 µm, bringing said talcose composition into contact with a solution, named a coloring solution, comprising cations, named coloring cations, of at least one element chosen from the transition metals, the lanthanides and the actinides, in order to obtain a talcose composition comprising colored silicate mineral particles.

2. The method as claimed in claim 1, wherein said particles have a thickness of from 1 nm to 100 nm, and the largest dimension of which is from 20 nm to 10 µm.

3. The method as claimed in claim 1, wherein said coloring solution is an aqueous solution.

4. The method as claimed in claim 1, wherein said coloring solution is a solution comprising at least one metal salt selected from the group consisting of the chromium salts, manganese salts, iron salts, cobalt salts, nickel salts, copper salts, zinc salts, cerium salts, neodymium salts, gadolinium salts, holmium salts, and mixtures thereof.

5. The method as claimed in claim 1, wherein said talcose composition is contacted with said coloring solution for a duration of from 10 minutes to 24 hours.

6. The method as claimed in claim 1, wherein said talcose composition is contacted with said coloring solution at a temperature of from 5° C. to 100° C.

7. The method as claimed in claim 1, wherein the colored silicate mineral particles that are obtained are rinsed with an aqueous solution which is at least substantially free of coloring cation.

8. The method as claimed in claim 1, wherein the colored silicate mineral particles that are obtained are dried.

9. The method as claimed in claim 1, wherein the talcose composition comprising colored phyllosilicate mineral particles that have been obtained is dried at a temperature of from 60° C. to 200° C.

10. The method as claimed in claim 1, wherein said composition comprising colored phyllosilicate mineral particles that has been obtained is subjected to heat treatment at a temperature of from 200° C. to 600° C.

11. The method as claimed in claim 1, wherein said phyllosilicate mineral particles are prepared by hydrothermal treatment of a composition comprising particles of the formula $(Si_xGe_{1-x})_4 M_3 O_{11}$, n'$H_2O$.

12. The method as claimed in claim 11, wherein said hydrothermal treatment is carried out for a duration of from 30 minutes to 60 days and at a temperature of from 150° C. to 600° C.

13. The method as claimed in claim 11, wherein said hydrothermal treatment is carried out under saturation vapor pressure.

14. The method as claimed in claim 2, wherein said coloring solution is an aqueous solution.

15. The method as claimed in claim 12, wherein said hydrothermal treatment is carried out under saturation vapor pressure.

16. The method as claimed in claim 2, wherein said thickness of said particles is from 5 nm to 50 nm.

17. The method as claimed in claim 5, wherein said duration that said talcose composition is contacted with said coloring solution is from 1 hour to 2 hours.

* * * * *